(12) United States Patent
Yang et al.

(10) Patent No.: US 12,141,419 B2
(45) Date of Patent: Nov. 12, 2024

(54) INFORMATION DISPLAY METHOD AND APPARATUS, DEVICE AND STORAGE MEDIUM

(71) Applicant: Beijing Bytedance Network Technology Co., Ltd., Beijing (CN)

(72) Inventors: Yuxin Yang, Beijing (CN); Chaopeng Liu, Beijing (CN); Ruixin Feng, Beijing (CN); Weiyi Chang, Beijing (CN)

(73) Assignee: Beijing Bytedance Network Technology Co., Ltd., Beijing (CN)

( * ) Notice: Subject to any disclaimer, the term of this patent is extended or adjusted under 35 U.S.C. 154(b) by 0 days.

(21) Appl. No.: 17/436,533

(22) PCT Filed: Jun. 28, 2021

(86) PCT No.: PCT/CN2021/102671
§ 371 (c)(1),
(2) Date: Sep. 3, 2021

(87) PCT Pub. No.: WO2022/042001
PCT Pub. Date: Mar. 3, 2022

(65) Prior Publication Data
US 2022/0326820 A1 Oct. 13, 2022

(30) Foreign Application Priority Data
Aug. 24, 2020 (CN) .......................... 202010857873.X

(51) Int. Cl.
*G06F 3/0483* (2013.01)
*G06F 3/04817* (2022.01)
*G06F 3/0484* (2022.01)

(52) U.S. Cl.
CPC ........ *G06F 3/0483* (2013.01); *G06F 3/04817* (2013.01); *G06F 3/0484* (2013.01)

(58) Field of Classification Search
None
See application file for complete search history.

(56) References Cited

U.S. PATENT DOCUMENTS 8,564,543 B2 * 10/2013 Chaudhri .............. G06F 1/1694
345/173
9,009,622 B2 * 4/2015 Roberts ................. G06F 3/0483
715/810

(Continued)

FOREIGN PATENT DOCUMENTS

| CN | 108717344 A | 10/2018 |
|---|---|---|
| CN | 110083282 A | 8/2019 |

(Continued)

OTHER PUBLICATIONS

International Search Report in International Patent Application No. PCT/CN2021/102671 (11 pages).

(Continued)

*Primary Examiner* — Haimei Jiang

(57) ABSTRACT

Embodiments of the present disclosure provide an information display method and apparatus, a device and a storage medium, the method including: controlling, in response to a first triggering operation for displaying a first user interface, a first navigation key to transform to a first function key; where the first navigation key is used to provide a function of switching another interface to the first user interface, and the first function key is used to provide a first function matching with the first user interface. The embodiments of the present disclosure can save screen space, and simplify user's operation steps, thereby improving user experience.

20 Claims, 10 Drawing Sheets

(56) References Cited

U.S. PATENT DOCUMENTS

| | | | |
|---|---|---|---|
| 10,175,848 B2* | 1/2019 | Haapsaari | G06F 3/04883 |
| 10,419,725 B2* | 9/2019 | Champagne | G08B 13/1968 |
| 10,719,163 B2* | 7/2020 | Lv | H04M 1/72469 |
| 11,068,128 B2* | 7/2021 | Zambetti | G06T 13/80 |
| 11,283,916 B2* | 3/2022 | Coffman | G06F 3/04847 |
| 11,537,281 B2* | 12/2022 | Zambetti | G06F 3/04817 |
| 11,550,468 B2* | 1/2023 | Lee | G06F 3/0488 |
| 2004/0100479 A1* | 5/2004 | Nakano | G06F 3/0485 715/700 |
| 2004/0250217 A1* | 12/2004 | Tojo | G06F 3/0482 715/845 |
| 2007/0150810 A1* | 6/2007 | Katz | G06F 3/0485 715/229 |
| 2007/0266334 A1* | 11/2007 | Donaldson | G06F 3/0483 715/777 |
| 2008/0109753 A1* | 5/2008 | Karstens | G06F 9/542 715/802 |
| 2012/0232681 A1* | 9/2012 | Mundy | G06F 16/4387 707/738 |
| 2012/0246596 A1* | 9/2012 | Ording | G06F 9/451 715/799 |
| 2013/0298024 A1* | 11/2013 | Rhee | H04M 1/67 715/716 |
| 2016/0334952 A1* | 11/2016 | Jia | G06F 3/0483 |
| 2017/0315716 A1* | 11/2017 | Zambetti | G06F 3/0488 |
| 2019/0073096 A1* | 3/2019 | Li | G06F 16/00 |
| 2020/0210064 A1* | 7/2020 | Li | H04M 1/72403 |
| 2021/0337064 A1* | 10/2021 | Zhang | H04M 1/72466 |

FOREIGN PATENT DOCUMENTS

| | | | | |
|---|---|---|---|---|
| CN | 110929054 A | | 3/2020 | |
| CN | 110968226 A | * | 4/2020 | G06F 3/0481 |
| CN | 111475063 A | | 7/2020 | |
| CN | 112000267 A | | 11/2020 | |
| CN | 112130729 A | | 12/2020 | |
| EP | 3680765 A1 | | 7/2020 | |

OTHER PUBLICATIONS

Chinese Patent Application No. 202010857873.X, First Office Action mailed Jan. 27, 2021, 10 pages.
Chinese Patent Application No. 202010857873.X, Second Office Action mailed Apr. 9, 2021, 7 pages.
Chinese Patent Application No. 202010857873.X, Third Office Action mailed Jul. 5, 2021, 7 pages.

* cited by examiner

INFORMATION DISPLAY METHOD AND APPARATUS, DEVICE AND STORAGE MEDIUM

CROSS-REFERENCE TO RELATED APPLICATIONS

This application is a national stage of International Application No. PCT/CN2021/102671, filed on Jun. 28, 2021, which claims priority to Chinese patent application No. 202010857873.X, filed on Aug. 24, 2020, and entitled "Information Display Method and Apparatus, Device and Storage Medium". Both of the aforementioned patent applications are is hereby incorporated by reference in their entireties.

TECHNICAL FIELD

Embodiments of the present disclosure relate to the technical field of computer technology, and in particular, to an information display method and apparatus, a device and a storage medium.

BACKGROUND

In a user interface (User Interface, UI for short) interaction, a multi-Tab (or label tab) page is a common and easy-to-use interaction manner in the user interface interaction, and different content in a same area can be easily switched by using the multi-Tab page.

At present, for the multi-Tab page, there may exist at least one function in some Tab pages, for example, for switching among multi-Tab pages including a playing page, a function for controlling play/pause is set in the playing page, and a Tab key with a playing-control function and a Tab key with a switching function are generally displayed separately to represent different functions. However, due to limited space of a screen, too many keys occupying the screen space will affect user experience, especially in a scenario with immersive music playing, too many keys will cause user operation steps to be complicated, which will affect user experience.

SUMMARY

Embodiments of the present disclosure provides an information display method and apparatus, a device and a storage medium, which can save screen space, and simplify user's operation steps, thereby improving user experience.

In a first aspect, an embodiment of the present disclosure provides an information display method, the method including:

controlling, in response to a first triggering operation for displaying a first user interface, a first navigation key to transform to a first function key;

where the first navigation key is used to provide a function of switching the other interface to the first user interface, and the first function key is used to provide a first function matching with the first user interface.

In a second aspect, an embodiment of the present disclosure provides an information display apparatus, the apparatus including:

a function-transforming module, configured to control, in response to a first triggering operation for displaying a first user interface, a first navigation key to transform to a first function key;

where the first navigation key is used to provide a function of switching the other interface to the first user interface, and the first function key is used to provide a first function matching with the first user interface.

In a third aspect, an embodiment of the present disclosure provides an electronic device, including:

at least one processor and a memory;

the memory stores a computer-executable instruction; and the at least one processor executes the computer-executable instruction stored in the memory to cause the at least one processor to execute the information display method in any one of the first aspect.

In a fourth aspect, an embodiment of the present disclosure provides a computer-readable storage medium storing a computer-executable instruction therein, and when executing the computer-executable instruction, the processor executes the information display method in any one of the first aspect.

In a fifth aspect, an embodiment of the present disclosure provides a computer program product including a computer program carried on a computer-readable medium, and the computer program, when executed by a processor, executes the information display method in any one of the first aspect.

In a sixth aspect, an embodiment of the present disclosure provides a computer program, where the computer program, when executed by a processor, executes the information display method in any one of the first aspect. According to the information display method and apparatus, the device and the storage medium provided by the embodiments of the present disclosure, a first user interface can be first provided by a terminal device, and in response to a first triggering operation for displaying the first user interface, a first navigation key can be controlled to transform to a first function key, and the first function key can be displayed in a same position in the first user interface, by which reusing of the first navigation key is realized, and switching between the first function key and the first navigation key in accordance with scenarios not only saves the screen space, but also simplifies user operation steps, thereby improving user experience.

BRIEF DESCRIPTION OF DRAWINGS

In order to illustrate technical solutions in the embodiments of the present disclosure or in the prior art more clearly, drawings that need to be used in the description of the embodiments or the prior art will be briefly described in the following. Obviously, the drawings described in the following are some embodiments of the present disclosure. For those skilled in the art, other drawings can also be obtained according to these drawings without any creative effort.

DESCRIPTION OF EMBODIMENTS

Figure 1:
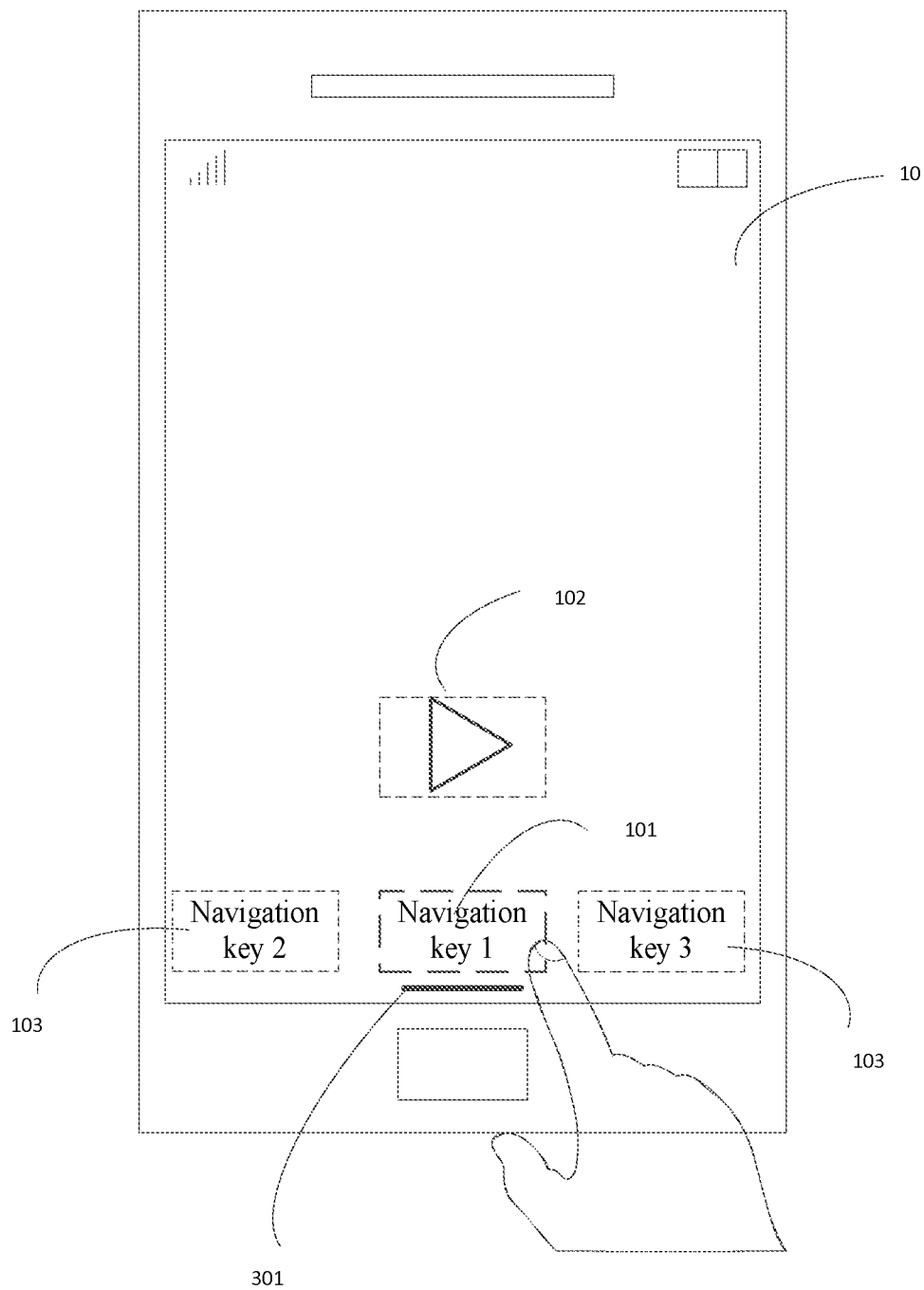
FIG. 1 is a schematic diagram of a playing page in the prior art.

Embodiments of the present disclosure will be described in more detail in the following with reference to the accompanying drawings. Although some embodiments of the present disclosure are represented in the drawings, it should be understood that the present disclosure can be implemented in various forms, and should not be illustrated to be limited by the embodiments described herein, in contrary, these embodiments are provided to help to understand the present disclosure more thoroughly and comprehensively. It should be understood that drawings and embodiments of the present disclosure are merely used as examples, but not to limit the protection scope of the present disclosure.

It should be understood that respective steps recorded in method embodiments of the present disclosure can be executed in different orders, and/or be executed in parallel. In addition, the method embodiments may include additional steps and/or omit executing shown steps. The scope of the present disclosure is not limited in this aspect.

The term "include" used herein and its variations are open inclusion, that is, "include but not limited to". The term "based on" is "at least partly based on". The term "one embodiment" represents "at least one embodiment"; the term "another embodiment" represents "at least another embodiment"; and the term "some embodiments" represents "at least some embodiments". Related definitions of other terms will be provided in the following.

It should be noted that concepts such as "first", "second" mentioned in the present disclosure are merely used to distinguish different apparatuses, modules or units, but not used to limit sequence or mutual dependency of functions executed by these apparatuses, modules or units.

It should be noted that modifiers such as "one" and "multiple" mentioned in the present disclosure are illustrative and not restrictive, and those skilled in the art should understand the modifiers should be understood as "one or more" unless it is clearly defined in the context.

Names of messages or information exchanged among a plurality of apparatuses or modules in the embodiments of the present disclosure are merely used for illustrative purposes, rather than limiting the scope of these messages or information.

In the prior art, for a multi-Tab page, there may exist at least one function key in some Tab pages, for example, aiming at switching among multi-Tab pages that include a playing page, a function for controlling play/pause is set in the playing page, and a Tab key with a play-control function and a Tab key with a switching function are generally displayed separately, to represent different functions. However, due to a limited space of a screen, too many keys occupying the screen space will affect user experience, especially in a scenario with immersive music playing, and too many keys will cause user operation steps to be complicated, which will affect user experience.

To illustrate clearly, switching among multi-Tab pages that include a playing page is taken as an example. It needs to be illustrated that description aiming at the playing page is merely illustrative, and the usage of a page with multiple keys can also be applied to the other Tab page, which is not limited herein. Where a Tab page is a user interface.

As shown in FIG. 1, FIG. 1 is a schematic diagram of a playing page in the prior art. In a current playing page 10, besides a Tab key 101 (for example, a navigation key 1) corresponding to the current playing page, there are also Tab keys corresponding to other pages (that is, the other Tab key 103 in addition to the Tab key corresponding to the playing page, such as a navigation key 2, a navigation key 3, etc.), where Tab keys can be used to represent navigation keys that are used to switch to corresponding interfaces. In addition, a playing-control area is further set in the current playing page, where a function key 102 is contained in the playing-control area, and the current interface is on a playing page 10. At this time, the navigation key 1, in combination with a position of a display identifier 301, can indicate or display the current interface in a form of lighting (the form of lighting can be highlighting the navigation key 1, for example, filling colors, and FIG. 1 exemplarily uses a deepened dashed box to indicate that the state is in the form of lighting, which is not limited here), which is similar when on other Tab pages (i.e., other interfaces). When requiring to paly/pause an audio/video in the playing page, a user can tap the playing-control area to activate a first function key, to implement control of playing/pausing of the audio/video; and when requiring to switch a page (a page is an interface), the user can tap a Tab key of a corresponding page to implement switching of the page. Therefore, the key corresponding to playing-control function and the key corresponding to switching function are displayed separately, causing that too much of a screen space is occupied, and too much of displaying space of the screen is occupied, causing the less displaying space for the audio/video. And due to separate display of the Tab key of the playing-control function and the key of the switching function, user operation steps are further increased, causing reduced user experience.

To solve the above problem, a technical concept of the present disclosure is to combine the display of the function key and the Tab key in the interface, and to display the function key or the Tab key according to a practical situation, so as to enable the function key and the Tab key to be switched flexibly, thereby achieving the reusing of the Tab key, that is, one key with multiple functions, which not only saves screen space, but also simplifies user operation steps, thereby improving user experience.

Technical solutions of the present disclosure will be described in detail with specific embodiments in the following. Specific embodiments in the following can be combined together, and same or similar concepts or processes may not be repeated in some embodiments.

An embodiment of the present disclosure provides an information display method, and the method may include:

controlling, in response to a first triggering operation for displaying a first user interface, a first navigation key to transform to a first function key.

The first navigation key is used to provide a function of switching the other interface to the first user interface, and the first function key is used to provide a first function matching with the first user interface. At the same time, due to transforming or switching of the key, a first navigation key is transformed to a first function key, where the position of the function key is the position of the first navigation key.

In an embodiment of the present disclosure, an executing subject may be a terminal device, such as a mobile terminal, a computer, etc., where the mobile terminal can be mobile devices having a function of playing such as a mobile phone, a tablet, etc.

Specifically, the first triggering operation is used to display the first user interface, where the first triggering operation may include a triggering operation for launching an application program to which the first user interface belongs or a triggering operation acting on the first navigation key. Where the triggering operation is a touching operation or a hand gesture sensing operation, which is not limited here.

In addition, the first user interface may be an interface including at least one function, for example, an interface including functions of playing-controlling, searching, collecting, etc., and the first user interface is not specifically limited here.

In an embodiment of the present disclosure, in response to the first triggering operation for displaying the first user interface, the first navigation key for switching to the first user interface can be controlled to be switched to the first function key, where the first function key matches with a first function supported in the first user interface, that is, the first function key is used to provide the first function of the first user interface. Reusing of the first navigation key is realized, causing corresponding functions be switched to according to different scenarios through one key, which saves space occupied by a plurality of keys in a screen, at the same time, since the function is changed in a same position area, a user does not need to operate a plurality of keys when selecting operations, which simplifies user operation steps, thereby improving user experience.

According to the information display method provided by the embodiment of the present disclosure, a first user interface can be first provided by a terminal device, and in response to a first triggering operation for displaying the first user interface, a first navigation key can be controlled to transform to a first function key, and the first function key can be displayed in a same position in the first user interface, by which reusing of the first navigation key is realized, and switching between the first function key and the first navigation key in accordance with scenarios not only saves the screen space, but also simplifies user operation steps, thereby improving user experience.

In a possible design, how to control the first navigation key to transform to the first function key can be implemented by the following steps:

step a1, determining, according to the first triggering operation, the first function matching with the first user interface; and step a2, displaying the first function key corresponding to the first function in the first user interface.

In an embodiment of the present disclosure, according to the first user interface displayed by the first triggering operation, the function that needs to be used in the first user interface is determined first, and then the first navigation key is switched to the function key matching with the function. For example, the first user interface is a playing interface or a playing page, which includes a playing-control function, then it is determined to switch the first navigation key to the function key corresponding to the playing-control function. If the first user interface is an interface including a searching function, it is determined to switch the first navigation key to the function key corresponding to the searching function, and so on, which will not be listed one by one here.

In a possible design, for a switched first function key, a second triggering operation acting on the first function key can be monitored in real time, and the embodiment of the present disclosure describes the information display method in detail on the basis of the above embodiment. The information display method may further include:

executing, in response to the second triggering operation acting on the first function key, an operation corresponding to the first function.

In an embodiment of the present disclosure, the second triggering operation here may be operations such as tapping, sliding, interactive hand gesture, etc., and when the second triggering operation acting on the first function key is monitored, in response to the second triggering operation, an operation matching with the first function can be executed according to a current state of the first user interface.

Illustratively, the first function is a playing-control function, and the first function key is a playing-control key, then the operation matching with the first function can be a playing-control operation or a pausing-control operation. When an audio/video in the first user interface is in a playing state, in response to the second triggering operation acting on the playing-control key, the audio/video in the first user interface is controlled to pause; and when an audio/video in the first user interface is in a pausing state, in response to the second triggering operation acting on the playing-control key, the audio/video in the first user interface is controlled to continue playing.

Illustratively, the first function is a searching function, and the first function key is a playing-control key, then an operation matching with the first function can be a searching operation, and in response to the second triggering operation acting on the playing-control key, a searching box, which is used to provide an input interface for content to be searched, in the first user interface is displayed.

Figure 2:
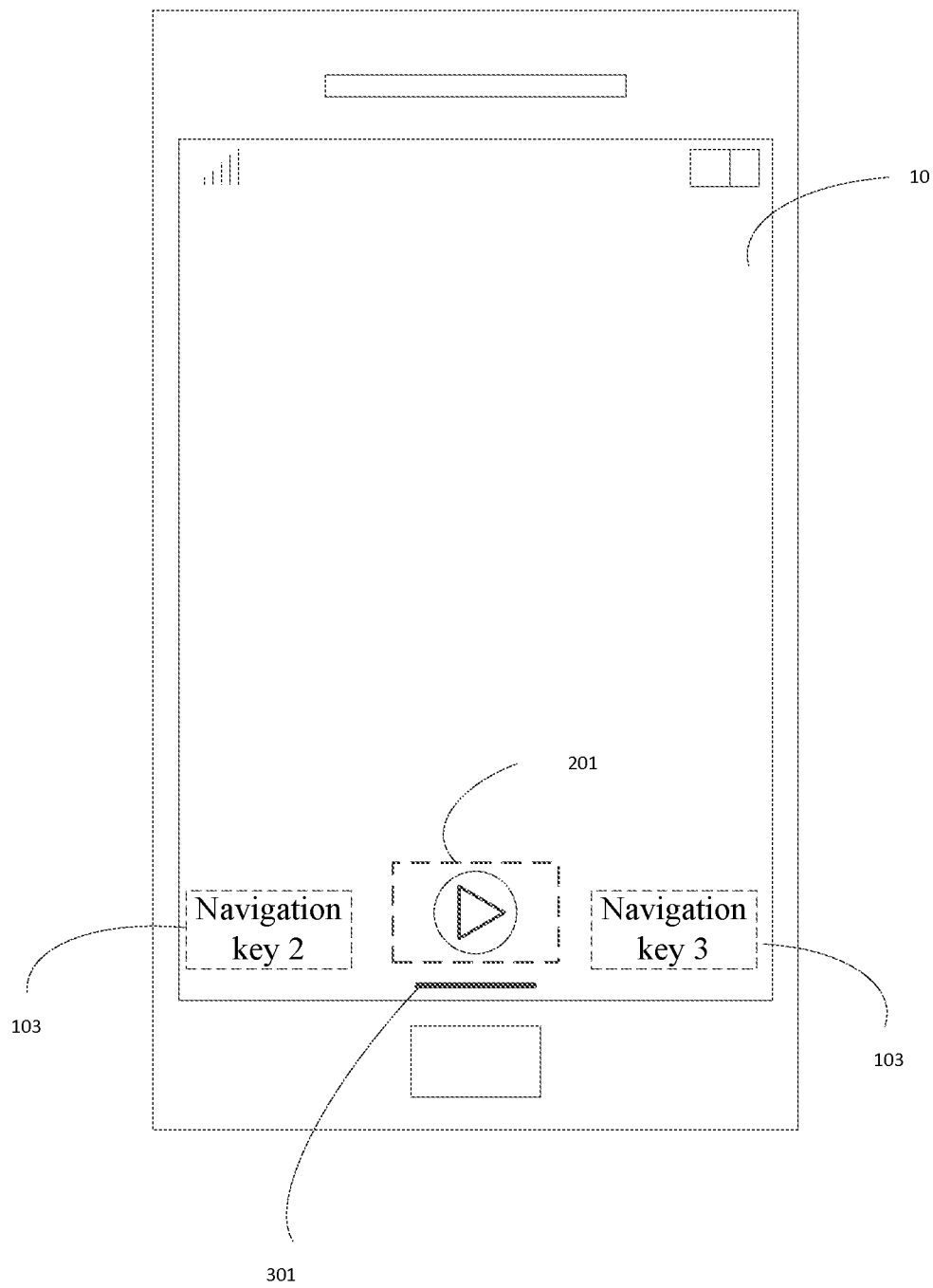
FIG. 2 is a schematic diagram of a playing page provided by an embodiment of the present disclosure.

To illustrate clearly, the first user interface being a playing interface or a playing page is taken as an example below. It is noted that description of the first user interface being a playing interface or a playing page is merely illustrative and the first user interface may also be the other interface including at least one function, which is not limited here. Referring to FIG. 2, FIG. 2 is a schematic diagram of a playing page provided by an embodiment of the present disclosure. In practical use, for a user interface with multi-Tab pages, switching among multi-Tab pages can be implemented through multiple Tab keys, where one Tab key (a navigation key) can switch one corresponding Tab page. In one scenario, a terminal device can provide a first user interface for playing the audio/video, such as a playing page 10, for convenience of understanding, how to implement information displaying will be described in detail below by taking the first user interface being the playing page as an example.

In a user interface with multi-Tab pages including a playing page (i.e., a playing page is included in the multi-Tab pages), in order to save screen space, when on the playing page, the Tab key corresponding to the playing page 10 (i.e., the first navigation key) is switched to the playing-control key (i.e., the first function key 201). As shown in FIG. 2, the playing-control key (i.e., the function key 102) within the playing-control area in the current playing interface is replaced (in an embodiment, there may not be a specific playing-control key, only a playing-control area is set, and the playing or pausing state can be switched only by touching the playing-control area, however, the playing-control area still occupies too much of the screen space, causing crowded screen space), and switching between the playing-control key and the first function key is implemented. Using the screen space occupied by a key to switch between different key functions not only saves screen space, but the user can implement different functions by only taping one position in the operation. Therefore, operation steps are simplified, thereby improving user experience.

Figure 3:
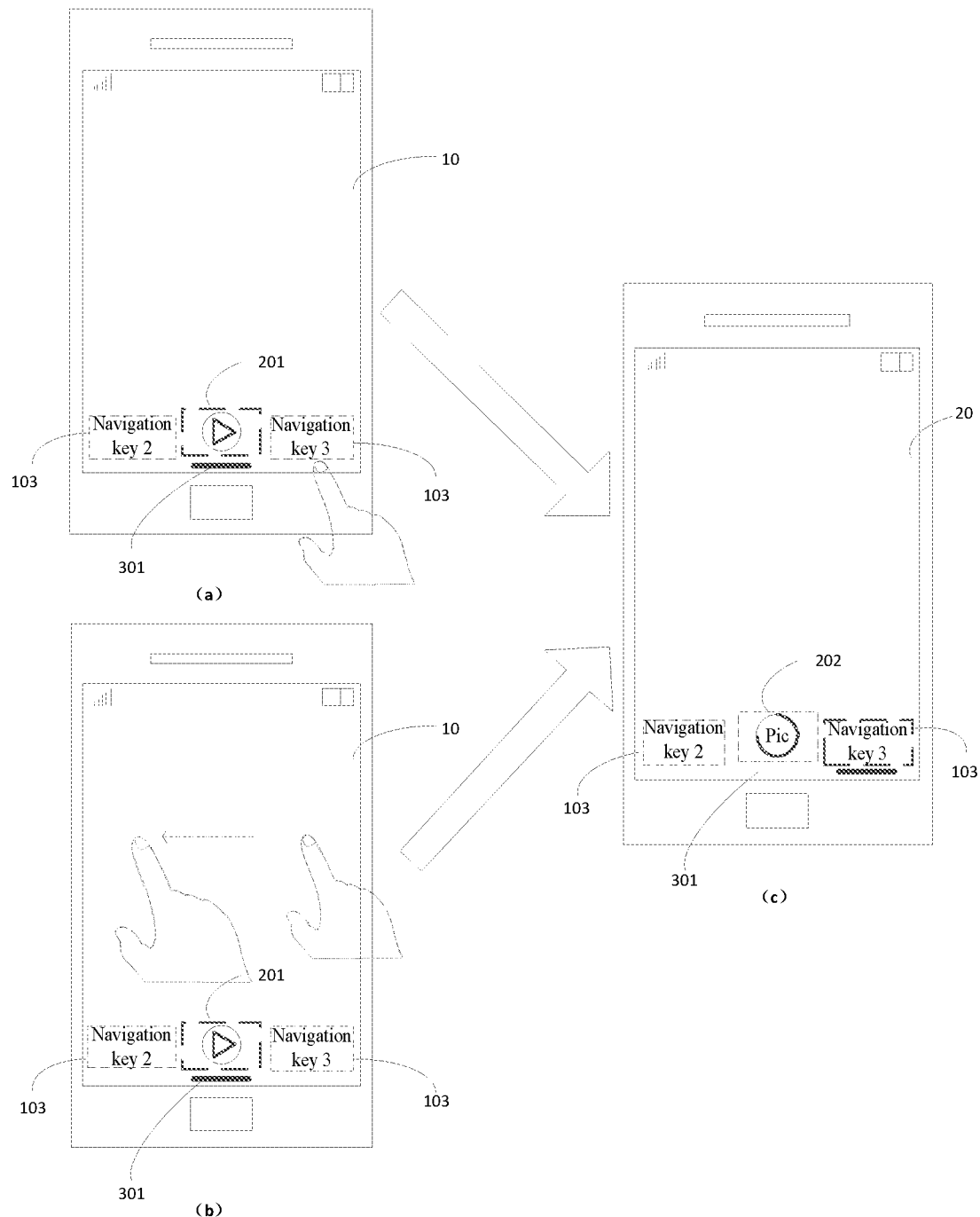
FIG. 3A to FIG. 3C are schematic diagrams of scenarios of an information display method provided by an embodiment of the present disclosure.

Specifically, the functions of the playing-control key and the first function key here can be switched according to practical scenarios, for example, when on the playing page, the first navigation key is switched to the first function key 201, that is, the switching function is switched to the playing/pausing-control function, as shown in FIG. 2. Therefore, the function of the playing-control key is no longer the Tab page switching function but the playing/pausing-control function; and when on switching pages corresponding to the other Tab key, the first function key is switched to the first navigation key 202, that is, the playing/pausing-control function is switched to the switching function (i.e., the Tab page switching function) corresponding to the Tab key, as shown in FIG. 3C. Therefore, the function of the playing-control key is no longer the playing/pausing-control function but the Tab page switching function.

Therefore, the information display method provided by the present disclosure can combine the display of the playing-control key and the Tab, and display the first function key or the Tab key (i.e., the first navigation key) according to practical situations, enabling the first function key and the Tab key to be switched flexibly, implementing one key having multiple functions, which not only saves screen space, but also simplifies user operation steps, thereby improving user experience.

Specifically, the information display method can be implemented by the following methods:

the method of the embodiment of the present disclosure can be applied to a terminal device, and a playing page for playing the audio/video and other Tab pages can be displayed on the terminal device, for example, a "hot search" Tab page, a "search" Tab page, a "hot list" Tab page, etc., which is not specifically limited here. Generally, one Tab key corresponds to one Tab page, and the playing page here corresponds to the first navigation key, when on the other Tab page, if wanting to open or jump to the playing page, the user can switch to the playing page from the other Tab page by tapping the first navigation key.

In one scenario, the playing page for recommending the audio/video to the user can be provided by the terminal device. Firstly, when the playing page is opened or is switching a next audio/video, a target audio/video to be played can be acquired, where the target audio/video to be played here can be an audio/video that is recommended to the user, or an audio/video that is randomly distributed, or an audio/video that is customized for the user or an audio/video that is specified or collected by the user, etc., and a source and acquiring method of the target audio/video are not specifically limited here. The audio/video here can be a song, an MV, etc., similarly, the audio/video is not specifically limited. For facilitating understanding of the embodiment, the target audio/video being a song recommended to the user can be taken as an example below, and how to implement information displaying is described in detail through the following embodiment.

In practical application, the information display method may include the following steps:

step b1, controlling, in response to a triggering operation for displaying a first user interface, the first navigation key to transform to a first function key, where the first function key is used to provide a play/pause function.

The first user interface is used to play the audio/video, and the first function is a playing/pausing-control function.

Figure 4:
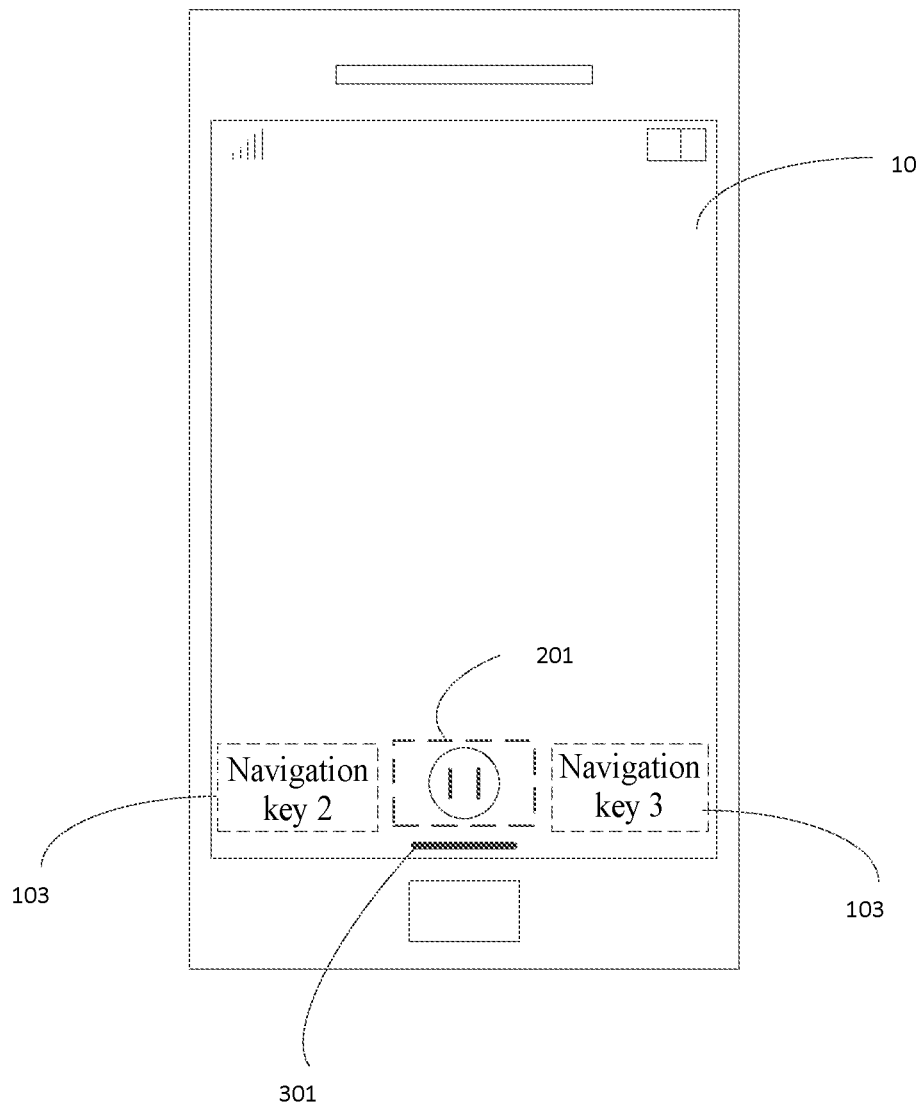
FIG. 4 is a schematic diagram of a scenario of an information display method provided by another embodiment of the present disclosure.

In the embodiment of the present disclosure, when the user opens the user interface with a multi-Tab page including a playing page provided by a terminal device, that is, when the playing page is opened for the first time, it can automatically jump to the playing page, as shown in FIG. 2; or when a Tab key corresponding to the playing page is triggered on the other switching page (i.e., the other interface), the other switching page is switched to the playing page, and the playing page is displayed, as shown in FIG. 2 or FIG. 4.

Specifically, the first navigation key is controlled to transform to the first function key, where the first function key is used to provide play/pause function, in which, when on the playing page, the first navigation key corresponding to the playing page becomes the first function key, which is used to provide a play/pause function. At this time, the play/pause function can be implemented by tapping the position of the first navigation key. For example, when the song in the playing page is in a playing state, the song can be paused by tapping the position of the first navigation key, i.e., the first function key; and when the song in the playing page is in a pausing state, the song can be continued to play by tapping the position of the first navigation key, i.e., the first function key. Where the first navigation key and the first function key are in the same position area, but are in different practical scenarios. Switching different functions correspondingly implements switching of functions, and the switching function and playing/pausing-control function displayed on the playing page will not be displayed at the same time, but are displayed alternatively. Since at least two functions are interactively implemented in the same position area, the user operation steps are simplified while the screen space is saved, and in order to implement different functions, operations only need to be performed in the same position area.

Step b2, displaying the target audio/video provided for the user in the first user interface.

In this embodiment, when the playing page is opened for the first time, the target audio/video to be played is acquired for example, the song recommended to the user. The information of the song is rendered in the playing page, the song recommended to the user starts to play in the playing page, and the song is displayed to the user in the playing page, for example, an album which the song belongs to, lyrics, an audio, playing progress of the song are displayed, which provides auditory and/or visual comfortable experience to the user. In a scenario where a switching page corresponding to the other Tab key is switched to the playing page, it only needs to resume the playing page, that is, resume an original state of the playing page, for example, in the playing state or in the pausing state.

Therefore, according to the information display method provided by the embodiment of the present disclosure, a first user interface for playing audio/video can be provided by a terminal device, and at first, a play/pause function of a target audio/video is provided by acquiring the target audio/video to be played, playing the target audio/video on the first user interface, and switching a first navigation key to a first function key, which implements the combination of display of the playing control and the Tab, and displays the first function key or the Tab key based on the practical application, which not only saves the screen space, but also simplifies the user operation steps, thereby improving user experience.

In an embodiment of the present disclosure, after the first navigation key is controlled to transform to the first function key, since the function of the position of the first navigation key is switched, the information displayed in the position of the first navigation key, i.e., the first function key for implementing a play/pause function, is also switched. Information displayed for the first function key may be an icon, which is used to represent whether the current state of the song in the playing page is the playing state or the pausing state. Specifically, it can be implemented by the following steps:

displaying a first icon on the first function key, where the first icon matches with the current playing state of the audio/video in the first user interface.

The first icon may include a pausing icon corresponding to the playing state of the target audio/video or a play ion corresponding to the pausing state of the target audio/video.

In an embodiment of the present disclosure, when the user opens the user interface provided by the terminal device for the first time, it will automatically jump to the playing page, at the same time, a song recommended to the user are displayed on the playing page. Therefore, the current state of the song in the playing page is in a to-be-played state, at this time, in order to represent that the current state of the song in the playing page is in the to-be-played state, the first icon displayed on the first function key is the play ion, as shown in FIG. 2.

When the user switches the other interface to the playing page by touching the first navigation key, if the song in the playing page is in the playing state before switching, the song in the playing page can be in the playing state after switching to the playing page, at this time, the icon displayed on the first function key is the pausing icon, as shown in FIG. 4. When the song in the playing page is in the playing-pause state (i.e., a pausing state or a to-be-played state), the song in the playing page may still be in the playing-pause state after switching to the playing state, as shown in FIG. 2.

In a possible design, the executing, in response to the second triggering operation acting on the first function key, an operation corresponding to the first function may include:

controlling, in response to the second triggering operation, the current state of the audio/video to change, and switching the first icon to a second icon, where the second icon matches with a changed state of the audio/video.

Specifically, in scenario 1, the first icon is the pausing icon:

controlling, in response to a triggering operation acting on the pausing icon, the target audio/video to pause playing, and switching the pausing icon to the second icon, where the second icon is used to represent the play ion corresponding to the pausing state of the target audio/video.

The triggering operation acting on the pausing icon can be the second triggering operation acting on the first function key.

Figure 5:
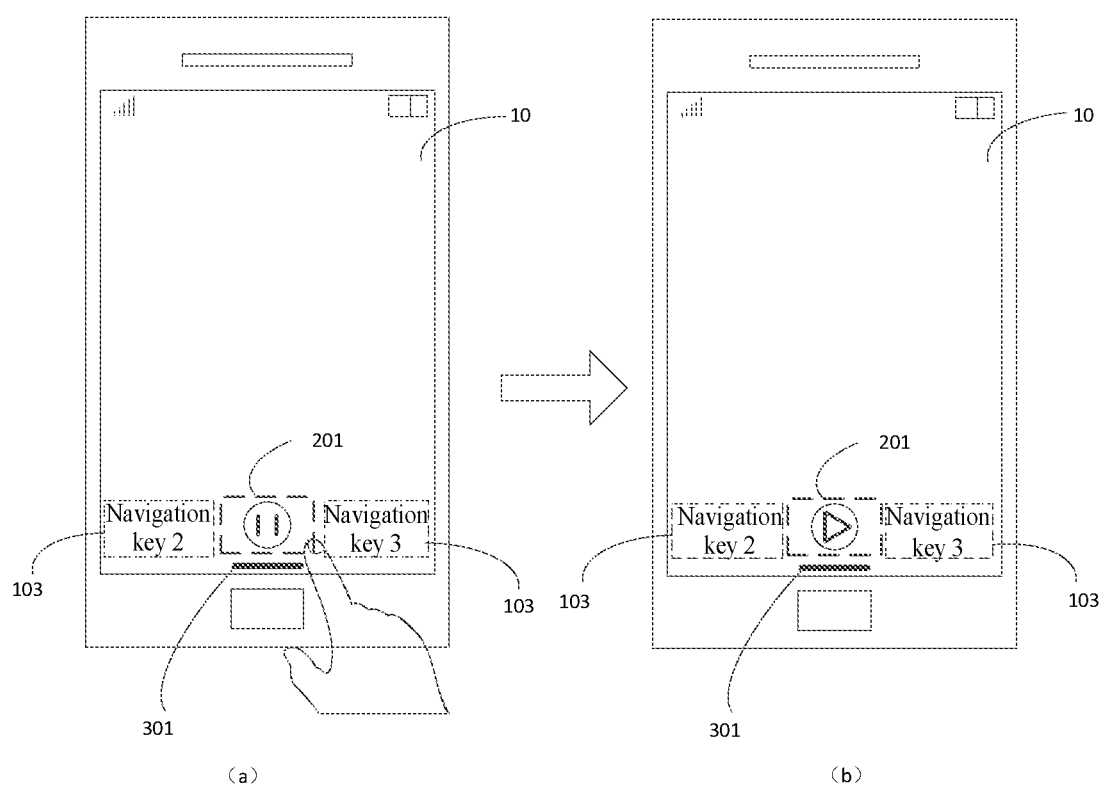
FIG. 5A to FIG. 5B are schematic diagrams of scenarios of an information display method provided by another embodiment of the present disclosure.

In an embodiment of the present disclosure, when the pausing icon is displayed on the first function key, if the user taps the first function key, at this time, the song in the playing page switches from the playing state to the pausing state, at the same time, the pausing icon on the first function key switches to the play ion. Therefore, if the pausing icon is currently displayed on the first function key, it is indicated that the playing page is in the playing state, and the pausing icon can be transformed to the play ion (as shown in FIG. 5B) by tapping the pausing icon (as shown in FIG. 5A).

In scenario 2, the first icon is the play ion:

controlling, in response to the triggering operation acting on the play ion, the target audio/video to continue playing, and switching the play ion to the pausing icon.

The triggering operation acting on the playing icon can be the second triggering operation acting on the first function key.

In an embodiment of the present disclosure, when the playing icon is displayed on the first function key, if the user taps the first function key, at this time, the song in the playing page switches from the pausing state to the playing state, at the same time, the playing icon on the first function key switches to the pausing icon. Therefore, if the playing icon is currently displayed on the first function key, it is indicated that the playing page is in the pausing state, and the pausing icon can be resumed (as shown in FIG. 6B) by tapping the playing icon (as shown in FIG. 6A).

Figure 6:
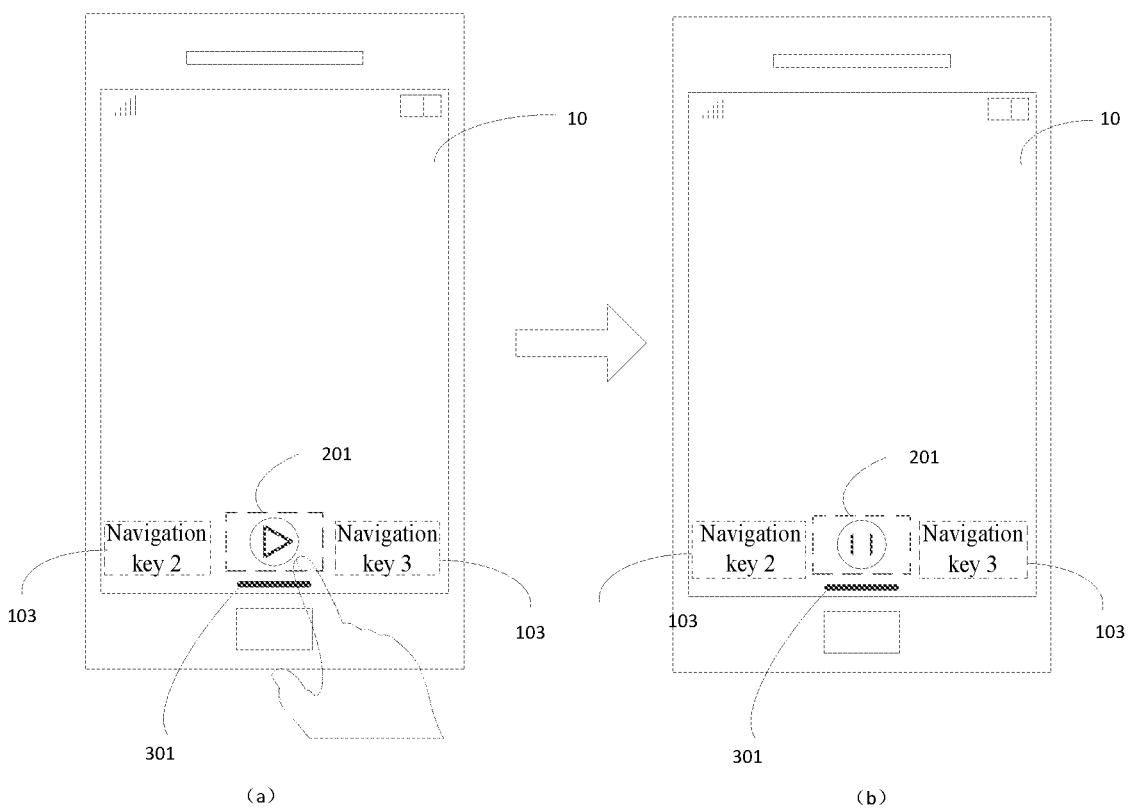
FIG. 6A to FIG. 6B are schematic diagrams of scenarios of an information display method provided by another embodiment of the present disclosure.

Specifically, on the playing page, since the Tab page switching function corresponding to the first navigation key is switched to the playing/pausing-control function, that is, the first navigation key is switched to the first function key, the user can directly tap on the first navigation key to implement playing/pausing-control function, in which operation steps are simple, and the method of displaying of switching different functions saves screen space occupied by keys, as shown in FIG. 5A- to FIG. 5B and FIG. 6A to FIG. 6B.

In an embodiment of the present disclosure, the first user interface can also be switched to the other interface, at the same time, the first function key is controlled to switch to the first navigation key. That is, the information display method may further include:

switching, in response to a third triggering operation acting on the first user interface or the other navigation key other than the first navigation key, the first user interface to the other interface matching with the other navigation key, and controlling the first function key to transform to the first navigation key.

Specifically, how to implement switching from the playing-control key to the Tab key (i.e., the first navigation key) can be implemented through at least two methods in the following:

method 1, implementing switching from the playing-control key to the Tab key by triggering operation;

switching, in response to the third triggering operation acting on the first user interface, the first user interface to the Tab interface matching with the other Tab key, and controlling the first function key to transform to the first navigation key.

In an embodiment of the present disclosure, on the basis of FIG. 2, if on the playing page, when the user taps the other Tab key displayed on the playing page (as shown in FIG. 3A), the playing page 10 is switched to the Tab interface 20 corresponding to the Tab key tapped by the user (the Tab interface 20 here may refer to the other interface other than the first user interface), for example, when "navigation key 3" is tapped, the playing page is switched to the interface corresponding to the navigation key 3, and the first function key 201 is switched to the first navigation key 202, as shown in FIG. 3C (the playing information relating to the target audio/video played on the playing page can be displayed on the first navigation key here, for example, a picture such as a song cover, an album cover, etc., and FIG. 3C is merely illustrative, which is not specifically limited here). That is, the playing-control key is switched to the Tab key, and the playing/pausing-control function is transformed to the Tab page switching function. Or, when the user performs a left-sliding operation or a right-sliding operation within the preset area in the first user interface (as shown in FIG. 3B), the playing page can also be switched to the Tab interface 20 corresponding to the user slide operation step, as shown in FIG. 3C.

Method 2, implementing switching from the playing-control to the Tab without triggering operation;

within a preset time interval, if no operation acting on the first user interface is monitored, the first function key is controlled to transform to the first navigation key.

Figure 7:
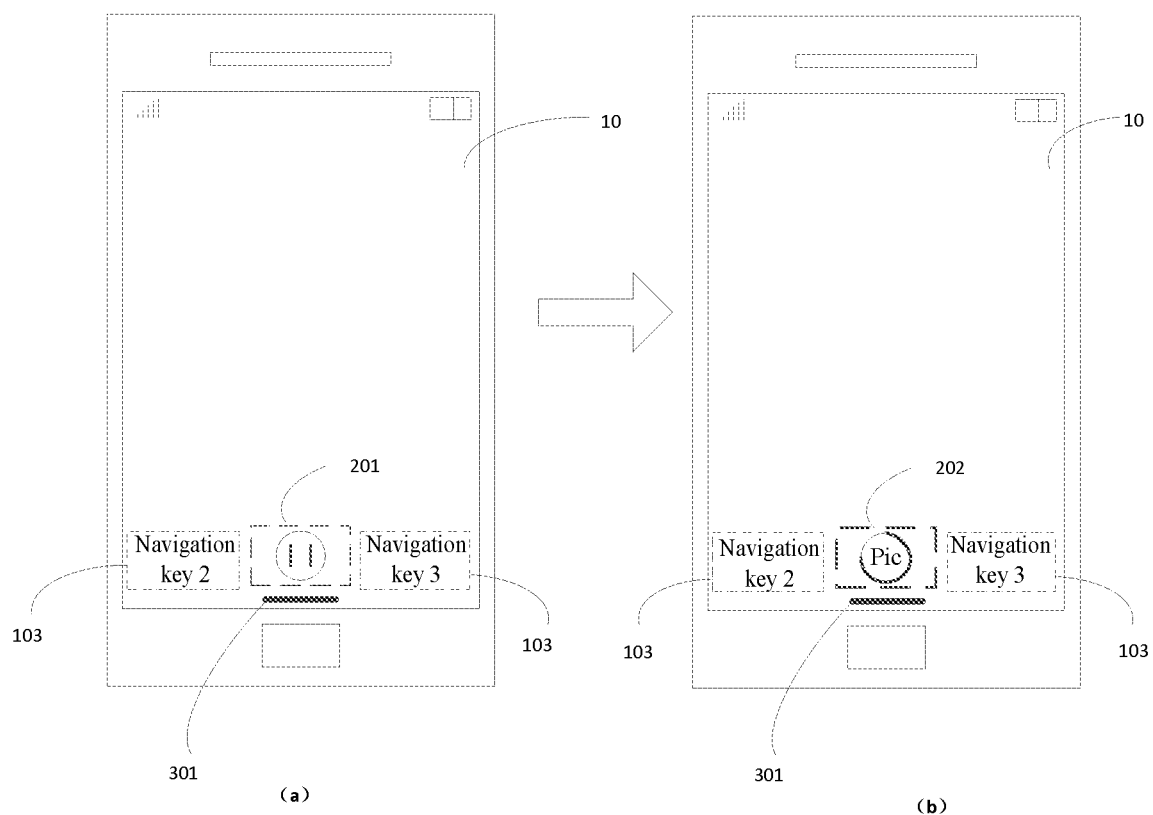
FIG. 7A to FIG. 7B are schematic diagrams of scenarios of an information display method provided by another embodiment of the present disclosure.

In one scenario, on the basis of FIG. 4, in which the playing is in immersive mode, in order to reduce the influence of the playing-control on the immersive mode or to avoid the playing state from being changed due to mistouch, whether there is any operation acting on the playing page can be monitored within a preset time interval, if it is not monitored, it is indicated that it is in the immersive mode, in order to reduce the influence of the playing-control on the immersive mode or to avoid the playing state from being changed due to mistouch, the first function key can be transformed to the first navigation key, as shown in FIG. 7A and FIG. 7B.

It should be noted that the transform operation implemented by method 1 and method 2 can also be understood as a screen-lock operation, but not a real screen-lock, but to lock the playing/pausing-control function, when the play/pause function needs to be resumed, the first navigation key can be tapped, that is, in order to unlock the play/pause function, the first navigation key is switched to the first function key which is used to provide play/pause function.

In an embodiment of the present disclosure, when the first function key is controlled to transform to the first navigation key, the playing information of the audio/video can be acquired, and the playing information is displayed on the first navigation key.

The playing information includes at least one of the following: a progress bar of the audio/video, a state of the progress bar, a picture matches with the audio/video; where the state of the progress bar is consistent to the current state of the audio/video.

In an embodiment of the present disclosure, the playing information of the song currently being played or paused in the playing page can be acquired and be displayed on the first navigation key, for example, related information of the song such as a music cover picture, a playing progress bar, a sound wave bar, a static/dynamic display picture, etc. The playing information displayed on the first navigation key may be at least one of a progress bar of the audio/video, a state of the progress bar, a picture matching with the audio/video. Illustratively, on the basis of FIG. 2 (or as shown in FIG. 6A), assuming that there exists a playing progress of the audio/video, referring to FIG. 3C, the first navigation key 202 as shown in FIG. 3C displays a picture combining the cover picture and the progress bar.

In addition, to display which Tab page the current interface is on, it can be displayed through the Tab key, for example, if on the playing page, the first navigation key corresponding to the playing page is displayed as a displaying identifier 301, as shown in FIG. 7A and FIG. 7B. It needs to be noted that the arrangement and layout of the multi-Tab or multiple Tab keys and other Tabs in FIG. 2, FIG. 3A to FIG. 3C, FIG. 4, FIG. 5A to FIG. 5B, FIG. 6A to FIG. 6B, and -FIG. 7A to FIG. 7B are all illustrative, which is not specifically limited here.

In an embodiment of the present disclosure, before the playing page is switched to the other Tab page, the user interface information corresponding to the other Tab key can be acquired, and the switching from the playing page to the other Tab page can be implemented through the following steps:

step c1, removing, in response to a fourth triggering operation acting on the first user interface, the first user interface and adding a new interface; and step c2, according to the user interface information, rendering the new interface, and generating and displaying the Tab interface matching with the other Tab key.

In an embodiment of the present disclosure, before the playing page is switched to the other Tab page, user interface information matching with the other Tab page can be pulled, for example, interface information of "hot list" or interface information of "my", then if there is a fourth triggering operation acting on the playing page, for example, a tapping operation acting on the other Tab key or a left-sliding operation or a right-sliding operation acting on the current interface, the current interface (referring to the playing page here) is removed, a new interface matching with the acquired user interface information is added, and the new interface is rendered, then the Tab interface matched with the other Tab key is generated and displayed. Where the other Tab page is the other interface.

In practical application, when launching, although it directly jumps to the playing page, information required by the hot list/my interface will be pulled in advance in the background, when the switching is tapped, the playing page is removed, the corresponding hot list/my interface is added, and the interface is re-rendered according to the information pulled in advance.

In an embodiment of the present disclosure, after the switching the first user interface to the Tab interface matching with the other Tab key, the display of the first user interface can also be resumed in response to a fifth triggering operation acting on the Tab interface.

Figure 8:
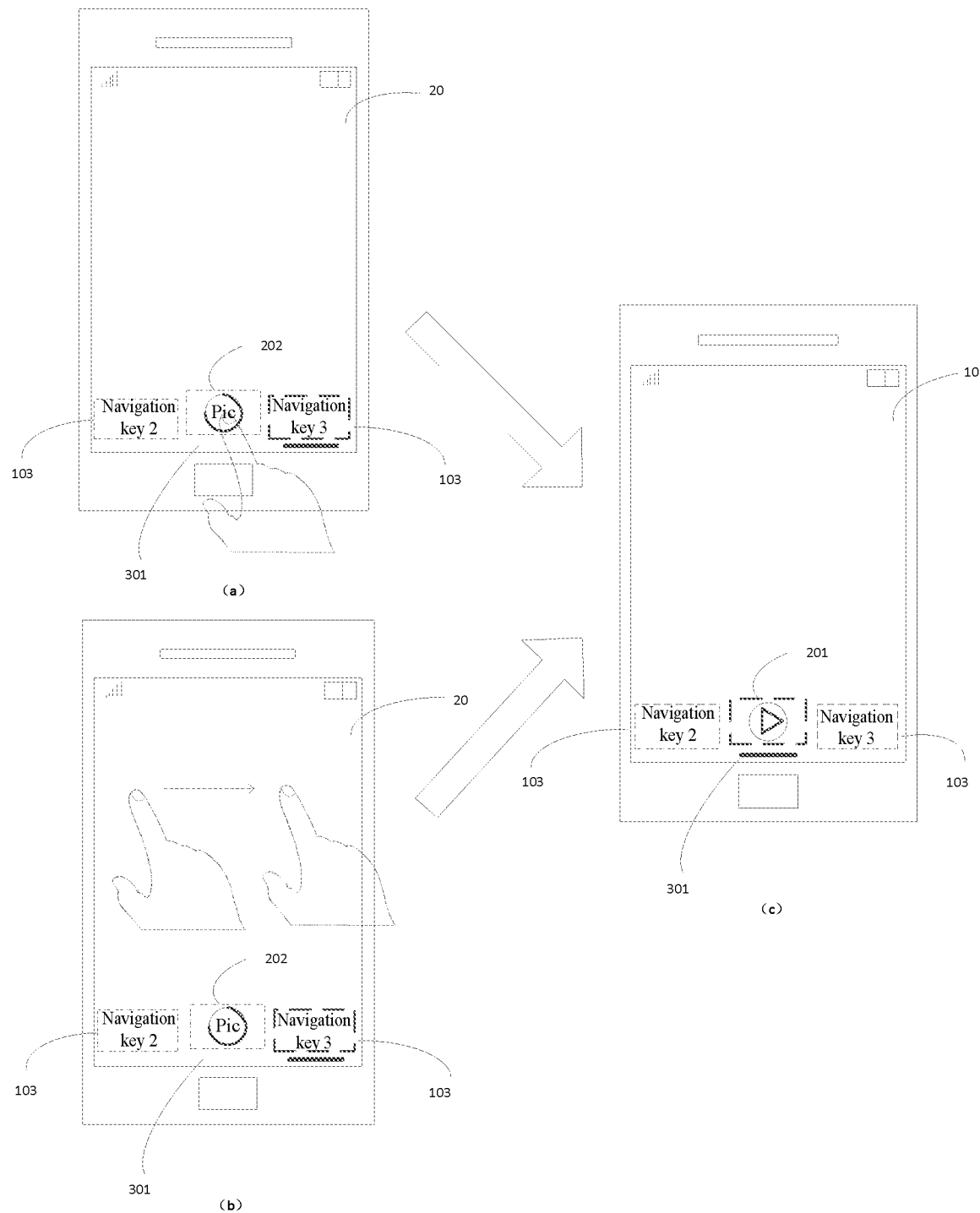
FIG. 8A to FIG. 8C are schematic diagrams of scenarios of an information display method provided by another embodiment of the present disclosure.

In an embodiment of the present disclosure, in response to the triggering operation, i.e., the fifth triggering operation, acting on the Tab interface, which can also be a tapping operation acting on the first navigation key for displaying the playing information (when tapping the first navigation key, the playing page can be directly switched to), in combination with FIG. 2, on the basis of FIG. 3C, as shown in FIG. 8A and FIG. 8C. The triggering operation can also be a left-sliding operation or a right-sliding operation acting on Tab interface (whether the operation is a left-sliding operation or a right-sliding operation can be determined according to a position relationship between the Tab key corresponding to the current Tab interface and the first navigation key, for example, when the Tab key corresponding to the current Tab interface is in the left of the first navigation key with one interval, the corresponding operation can be a right-sliding operation, more specifically, double right-sliding, and when they are adjacent to each other, the triggering operation can be a single right-sliding), on the basis of FIG. 3C, as shown in FIG. 8B and FIG. 8C. After the playing page is switched to the Tab interface 20 matching with the other Tab key 103, if wanting to resume the playing page 10, the user can tap the corresponding first navigation key 202 at the bottom of the playing page to switch to the playing page 10, at the same time, the original state of the playing page is resumed, for example, the playing state or the pausing state, and the process of transforming in the embodiment of the present disclosure can be combined with FIG. 2 and FIG. 3A to FIG. 3C, as shown in FIG. 8A to FIG. 8C. It needs to be noted that no matter it is in the Tab interface 20 matching with the other Tab key 103 or in the playing interface, the user interface displayed by the terminal device can display multi-Tab, for example, the first navigation key 202 and the other Tab key 103.

In an embodiment of the present disclosure, the information display method may further include: maintaining, after the other interface matching with the other navigation key is switched to, the playing state of the audio/video before the other interface matching with the other navigation key is switched to.

Specifically, after the first function key is switched to the first navigation key, when the user taps the first navigation key again or taps the playing information displayed by the first navigation key or performs a left-sliding operation or a right-sliding operation in the current interface, it can be switched back to the playing page, which does not affect the playing/pausing of the music, as shown in FIG. 8A to FIG. 8C. Where the playing information here can be a cover of the song or a static/dynamic displaying picture of the song.

Figure 9:
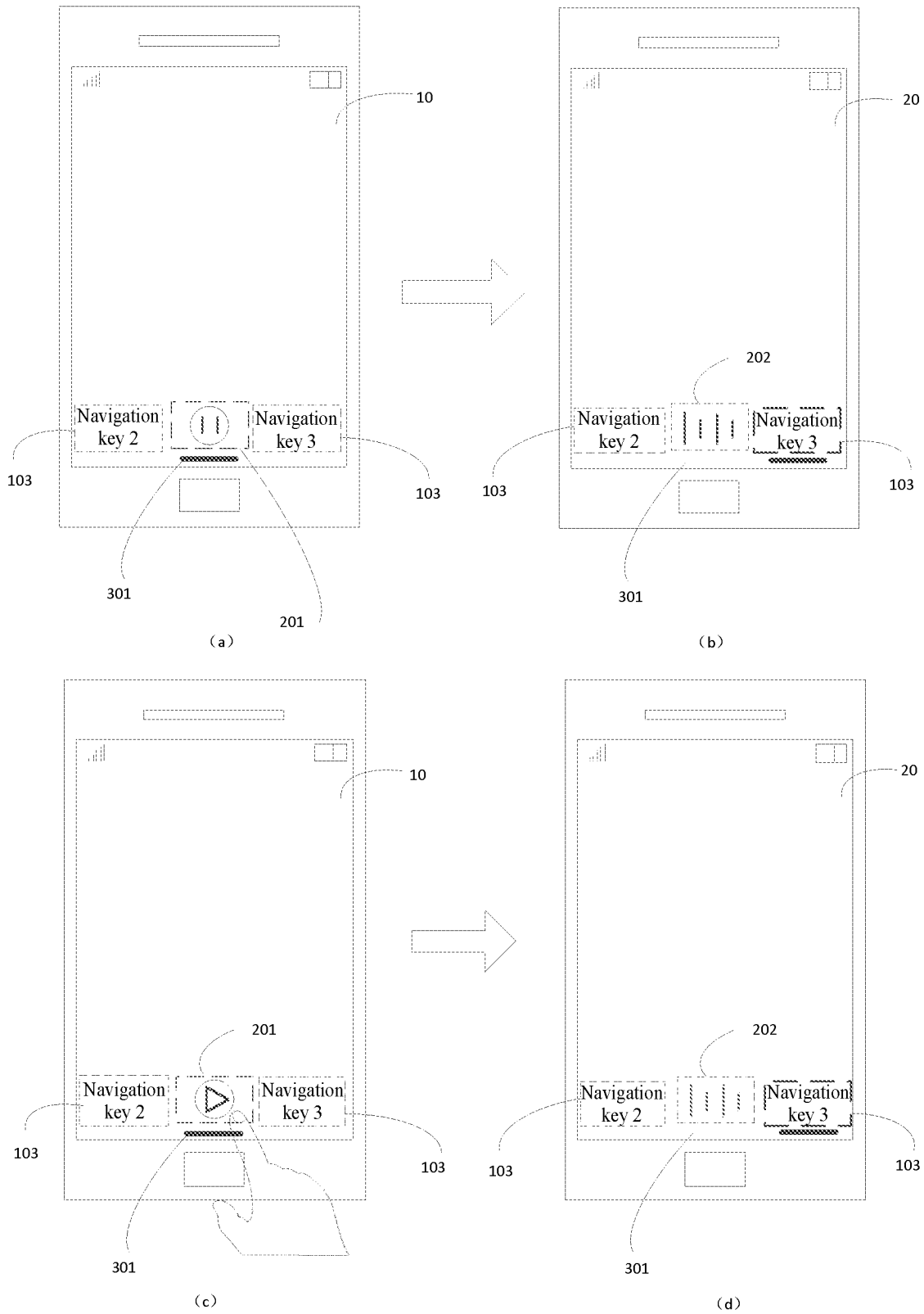
FIG. 9A to FIG. 9D are schematic diagrams of scenarios of an information display method provided by another embodiment of the present disclosure.

In an embodiment of the present disclosure, how to acquire the playing information of the target audio/video can be implemented by at least two implementations in the following:

implementation 1, displaying the playing state by a sound wave bar, as shown in FIG. 9A to FIG. 9D, a static diagram of the sound wave bar is displayed on the first navigation key 202 in FIG. 9D, and a dynamic diagram of the sound wave bar is displayed on the first navigation key 202 in FIG. 9B. The "dynamic" here can refer to dynamic trembling of the sound wave. It needs to be noted that the static display area and the dynamic display area needs to be separated, and FIG. 9A to FIG. 9D are merely illustrative, which does not specifically limit the specific static/dynamic display of the sound wave bar.

As shown in FIG. 9A to FIG. 9D, how to acquire the playing information of the target audio/video can be implemented by the following steps:

if the audio/video in the playing page is in the playing state (as shown in FIG. 9A), after the playing page is switched to the interface corresponding to the other navigation key (such as navigation key 3), the first function key is switched to the first navigation key 202, and the dynamic trembling sound wave bar is displayed on the first navigation key (since the picture cannot display dynamic effect, the state of the sound wave bar on the first navigation key 202 can be represented by deepened black lines, as shown in FIG. 9B); and if the audio/video in the playing page is in the playing-pause state (as shown in FIG. 9C), after the playing page is switched to the interface corresponding to the other navigation key (such as navigation key 3), the first function key is switched to the first navigation key 202, and the static sound wave bar is displayed on the first navigation key (the state of the sound wave bar on the first navigation key 202 can be represented by using light black lines, as shown in FIG. 9D). In practical application, if the background of the player is in the playing state when the audio/video is being played, a dynamic diagram of the sound wave bar is placed; and if the audio/video is in the pausing state, a static diagram is placed. Both the dynamic diagram and the static diagram are prepared in advanced, and the dynamic diagram is displayed in different colors to further highlight the state.

In an embodiment of the present disclosure, when the first function key is controlled to transform to the first navigation key, the state of the sound wave bar can be obtained at the same time, that is, the state of the song in the playing page before the first function key is control to transform to the first navigation key, for example, the playing state, and the pausing state.

Specifically, if the state of the song is the playing state, the corresponding sound wave bar is dynamic, which means that the sound wave bar is trembling dynamically. In order to match with the sound wave bar which is dynamically trembling, a target sound wave bar with a length of a preset window on the sound wave bar which is trembling can be obtained in real time as the dynamic diagram of the song, where the dynamic diagram is the playing information for displaying on the first navigation key. If the state of the song is in the pausing state, the corresponding sound wave bar is in a static state, which means that the sound wave bar is static. In order to match with the static sound wave bar, a target sound wave bar with a length of a preset window can be obtained on the position of the sound wave bar where the progress bar is located in when the playing is paused or under the static state as the static diagram of the song, where the static diagram is the playing information for displaying on the first navigation key.

Implementation 2, the playing information can be the cover picture of the song in combination with the progress bar. How to acquire the playing information of the target audio/video can be implemented by the following steps:

step d1, acquiring a cover picture relating to the target audio/video according to the target audio/video;

step d2, generating a progress bar in consistence with the current playing progress of the target audio/video according to acquired current playing progress of the target audio/video; and step d3, merging the progress bar with the cover picture according to the playing/pausing state of the acquired target audio/video in the first user interface, and generating the playing information of the target audio/video.

In an embodiment of the present disclosure, the cover picture here can be an album cover picture corresponding to the song or a publicity picture corresponding to the song, etc., which is not specifically limited here. A cover picture relating to the song can be firstly acquired, a matched progress bar is generated according to the acquired current playing progress of the song, and then the playing information is formed by combining the progress bar and the album picture, as shown in FIG. 3C.

It needs to be noted that the form of the progress bar shown in FIG. 9A to FIG. 9D is merely illustrative, and is not specifically limited to in an embodiment of the present disclosure. How to implement the merging between the progress bar and the cover picture and how to generate the playing information of the target audio/video can be implemented through the following steps:

step e1, if the target audio/video in the first user interface is in a playing state, the progress bar changes following the playing progress of the target audio/video, and the state of the progress bar is determined to be dynamic;

step e2, if the target audio/video in the first user interface is in a pausing state, the progress bar in the playing information does not change, and the state of the progress bar is determined to be static; and step e3, according to a contour of the cover picture, matching the progress bar with the contour of the cover picture, and generating the playing information of the target audio/video, where the playing information includes the progress bar, the state of the progress bar and the cover picture.

In an embodiment of the present disclosure, the progress bar can be embedded to the contour of the cover picture according to the contour of the cover picture, when the song in the playing page is in the playing state, the progress bar changes on the contour of the cover picture following the playing progress of the song, at the same time, the entire playing information (such as the cover picture and the progress bar) rotates following the song dynamic; and when the song in the playing page is in the pausing state, the progress bar on the contour of the cover picture does not make any change, but the cover picture can be static or dynamic.

In an embodiment of the present disclosure, the method may further includes: controlling, in response to a press operation acting on a random key, an icon corresponding to the random key to deform, where the random key includes at least the first function key, the first navigation key, and the other navigation key.

Specifically, when the user performs a press operation on the first function key corresponding to the playing page, in order to provide a simulated effect of pressing to the user, the icon corresponding to the first function key can represents displaying effects of zooming, animation, etc.

In an embodiment of the present disclosure, the method may further include: acquiring, in response to a sixth triggering operation acting on the first user interface, a next target audio/video to be played and playing the next target audio/video to be played on the first user interface.

In an embodiment of the present disclosure, the sixth triggering operation here can be an up-sliding operation or a down-sliding operation. The song can be switched through the up-sliding operation or the down-sliding operation in the playing page. Specifically, when the user performs the up-sliding operation or the down-sliding operation within a preset area in the playing page, the next target audio/video to be played can be acquired firstly, and the song in the playing page is switched to the next target audio/video to be played, and the next target audio/video to be played is played on the playing page.

In one scenario, all Tabs can be distributed on the bottom of the user interface, and the Tab corresponding to the playing page can be located at a bottom center. When on the playing page, the Tab at the middle bottom becomes a playing-control module (the first function key), at this time, the playing-pause function is implemented by tapping. When the current song is being played, the pausing icon is displayed, and when the current song is paused, the playing icon is displayed. When the other page is switched to by tapping hot list/my, the middle Tab becomes the Tab key (i.e., the first navigation key). At this time, what is displayed is the cover picture and progress of the current song. Tapping the cover will only cause that the playing page is switched to, and will not affect the playing and pausing of the music, at the same time, when the up-sliding operation or the down-sliding operation is performed in the playing page, a next music can be switched to.

Therefore, the method provided by the present disclosure increases the screen space and decreases influence of the playing-control on the immersive mode. By combining the display of the first function key and the Tab key, and displaying the first function key or the Tab key according to the actual circumstance, not only the screen space is saved, but also the user operation is simplified, thereby improving user experience.

In correspondence to the information display method in the above embodiments disclosed, the information display apparatus may be a terminal device. For convenience of description, only parts relating to the embodiments of the present disclosure are displayed. The information display apparatus may include: a function-transforming module; where the function-transforming module is configured to control, in response to a first triggering operation for displaying a first user interface, a first navigation key to transform to a first function key; and the first navigation key is used to provide a function of switching the other interface to the first user interface, and the first function key is used to provide a first function matching with the first user interface.

The function-transforming module provided by the embodiment of the present disclosure is configured to control, in response to a first triggering operation for displaying the first user interface, a first navigation key to transform to a first function key, and display the first function key in a same position in the first user interface, by which reusing of the first navigation key is realized, and switching between the first function key and the first navigation key in accordance with scenarios not only saves the screen space, but also simplifies user operation steps, thereby improving user experience.

The apparatus provided by an embodiment of the present disclosure can be configured to execute technical solutions of the method embodiments corresponding to the first aspect and the various possible designs of the first aspect above, the implementing principle and the technical effect of which are similar, and will not be repeated here in the embodiment of the present disclosure.

In an embodiment of the present disclosure, on the basis of the above embodiments disclosed, the embodiment of the present disclosure describes the information display apparatus in detail. The function-transforming module is specifically configured to: determine a first function matching with a first user interface according to the first triggering operation; and display a first function key corresponding to the first function in the first user interface.

In an embodiment of the present disclosure, the information display apparatus may further include: a function-executing module; where the function-executing module is configured to execute, in response to a second triggering operation acting on the first function key, an operation corresponding to the first function.

In an embodiment of the present disclosure, the first user interface is used to play an audio/video, where the first function is a playing/pausing-control function; the information display apparatus may further include: an icon-processing module; and the icon-processing module is configured to display a first icon on the first function key, where the first icon matches with a current playing state of the audio/video in the first user interface.

In an embodiment of the present disclosure, the icon-processing module is specifically configured to display, after the first navigation key is controlled to transform to the first function key, a first icon corresponding to the first function key, where the first icon is used to represent a corresponding pausing icon of the target audio/video in the playing state; control, in response to the first triggering operation acting on the pausing icon, the target audio/video to pause playing, and switch the pausing icon to a second icon, where the second icon is used to represent a corresponding playing icon of the target audio/video in pausing state; and control, in response to the second triggering operation acting on the playing icon, the target audio/video to continue playing, and switch the playing icon to the pausing icon.

In an embodiment of the present disclosure, the function-executing module is specifically configured to: control, in response to the second triggering operation, a current state of the audio/video to change, and switch the first icon to the second icon, where the second icon matches with a changed state of the audio/video.

In an embodiment of the present disclosure, the function-transforming module is further configured to: switch, in response to a third triggering operation acting on the first user interface or the other navigation key other than the first navigation key, the first user interface to the other interface matching with the other navigation key, and control the first function key to transform to the first navigation key.

In an embodiment of the present disclosure, the information display apparatus may further include: a playing information-acquiring module; where the playing information-acquiring module is configured to acquire playing information of the audio/video, and display the playing information on the first navigation key.

In an embodiment of the present disclosure, the information display apparatus may further include: a processing module; where the processing module is configured to maintain, after switching to the other interface matching with the other navigation key, a playing state of the audio/video before switching to the other interface matching with the other navigation key.

In an embodiment of the present disclosure, the playing information includes at least one of the following: a progress bar of the audio/video, a state of the progress bar, and a picture matching with the audio/video; where the state of the progress bar is consistent with the current state of the audio/video.

In an embodiment of the present disclosure, the information display apparatus may further includes: a pressing module; where the pressing module is configured to control, in response to a press operation acting on a random key, an icon corresponding to the random key to deform, where the random key includes at least the first function key, the first navigation key, and the other navigation key.

Figure 10:
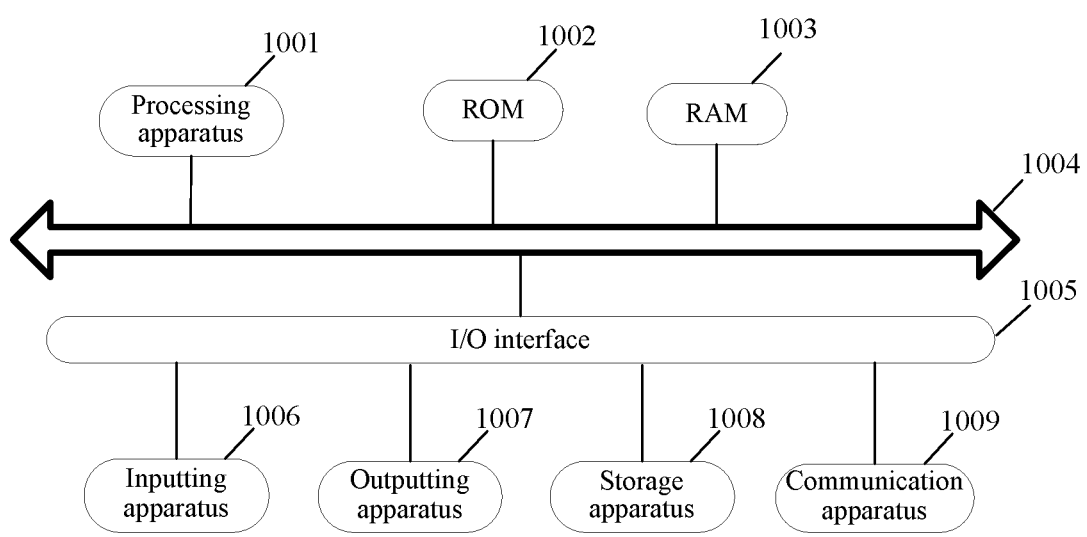
FIG. 10 is schematic structural diagram of a hardware of an electronic device provided by an embodiment of the present disclosure.

Referring to FIG. 10, which shows a schematic structural diagram of an electronic device 1000 suitable for implementing the embodiments of the present disclosure. The electronic device 1000 may be a terminal device or a server. Where the terminal device may include, but not limited to, mobile terminals such as a mobile phone, a laptop, a digital broadcast receiver, a personal digital assistant (Personal Digital Assistant, PDA for short), a portable android device (Portable Android Device, PAD), a portable media player (Portable Media Player, PMP), a vehicle-carried terminal (for example, a vehicle-carried navigation terminal), etc., and fixed terminals such as a digital TV, a desk computer, etc. The electronic device shown in FIG. 10 is merely an example, which should not limit the function and the application scope of the embodiments of the present disclosure.

As shown in FIG. 10, an electronic device may include a processing apparatus (for example, a central processor, a graphical processor) 1001, which can execute various appropriate actions and processing according to a program stored in a read only memory (Read Only Memory, ROM for short) 1002 or a program loaded from a storage apparatus 1008 to a random access memory (Random Access Memory, RAM) 1003. In RAM 1003, various programs and data required for the operation of the electronic device are also stored. The processing apparatus 1001, the ROM 1002 and the RAM 1003 are connected to each other through a bus 1004. An input/output (I/O) interface 1005 is also connected to the bus 1004.

Generally, the following apparatuses can be connected to the I/O interface 1005: an input apparatus 1006 including, for example, a touching screen, a touching plate, a keyboard, a mouse, a camera, a microphone, an accelerator, a gyroscope, etc.; an output apparatus 1007 including, for example, a liquid crystal display (Liquid Crystal Display, LCD for short), a speaker, a vibrator, etc.; a storage apparatus 1008 including, for example, a magnetic tape, a hard disk, etc.; and a communication apparatus 1009. The communication apparatus 1009 can allow the electronic device to perform wireless or wired communication with other devices to exchange data. Although the electronic device with various apparatuses is shown in FIG. 10, it should be understood that it is not required to implement or have all of the illustrated apparatuses. Alternatively, it can implement or have more or fewer apparatuses.

In particular, according to the embodiment of the present disclosure, the progress described above with reference to the flowchart can be implemented as a computer software program. For example, an embodiment of the present disclosure includes a computer program product, which includes a computer program carried on a computer-readable medium, where the computer program includes a program code used to execute the method shown in the flowchart. In such embodiment, the computer program can be downloaded and installed from a network through the communication apparatus 1009, or be installed from the storage apparatus 1008, or be installed from the ROM 1002. When the computer program is executed by the processing apparatus 1001, the above function defined in the methods of the embodiments of the present disclosure is executed.

It needs to be noted that the computer-readable medium above in the present disclosure may be a computer-readable signal medium or a computer-readable storage medium, or any combination of the above two. The computer-readable storage medium can be, but not limited to, an electrical, a magnetic, an optical, an electromagnetic, an infrared, or a semiconductor system, an apparatus, or a component, or any combination of the above. A more specific example of the computer-readable storage medium may include, but not limited to: an electronic connection with one or more cables, a portable computer magnetic disk, a hard disk, a random access memory (RAM), a read only memory (ROM), an erasable programmable read only memory (Erasable Programmable Read Only Memory, EPROM), a flash memory, an optical fiber, a portable compact disk-read only memory (Compact Disk-Read Only Memory, CD-ROM), an optical storage component, a magnetic storage component, or any suitable combination of the above. In the present disclosure, the computer-readable storage medium can be any tangible mediums including or storing a program, where the program can be used by an instruction-executing system, an apparatus or a component, or be used in combination with them. In the present disclosure, the computer-readable signal medium can include a data signal propagating in a baseband or as a part of a carrier wave, which carries a computer-readable program code. The data signal can be propagated by adopting various forms, which includes, but not limited to, an electromagnetic signal, an optical signal, or any suitable combination of the above. The computer-readable signal medium can also be any computer-readable medium other than the computer-readable storage medium, where the computer-readable signal medium can send, propagate or transmit a program used by or in combination with an instruction-executing system, an apparatus or a component. The program code included on the computer-readable medium can be transmitted by any suitable medium, which includes, but not limited to: a cable, an optical cable, radio frequency (Radio Frequency, RF), etc., or any suitable combination of the above.

The above computer-readable storage medium can be included in the electronic device above; or exist alone while not being assembled into the electronic device.

The computer-readable medium carries one or more programs, when the above one or more computer programs, when executed by the electronic device, cause the electronic device to execute the method shown in the embodiments disclosed above.

The computer program code for executing the operation of the present disclosure can be written in one or more programming languages or the combination thereof, and the above programming languages include object-oriented programming languages such as Java, Smalltalk, C++, and also include conventional procedural programming languages such as "C" language, or similar programming languages. The program code can be completely executed on a user computer, partially executed on a user computer, executed as an independent software package, partially executed on a user computer and partially executed on a remote computer, or completely executed on a remote computer or a server. In cases involving remote computers, the remote computers can be connected to user computers through any kind of networks, which includes a local area network (Local Area Network, LAN for short) or a wide area network (Wide Area Network, WAN for short), or can be connected to external computers (for example, using Internet service providers to connect through the Internet).

The flowcharts and block diagrams in the drawings illustrate the architecture, functions and operations of possible implementations of systems, methods and computer program products according to various embodiments of the present disclosure. In this regard, each block in the flowchart or block diagram may represent a module, a program segment, or a part of code containing one or more executable instructions for implementing specified logical functions. It should also be noted that in some alternative implementations, the functions noted in the blocks may also occur in an order different from those noted in the drawings. For example, two blocks represented in succession may actually be executed substantially in parallel, and they may sometimes be executed in a reverse order, depending on the functions involved. It should also be noted that each block in the block diagrams and/or flowcharts, and combinations of blocks in the block diagrams and/or flowcharts, can be implemented by a dedicated hardware-based system that performs specified functions or operations, or can be implemented by a combination of dedicated hardware and computer instructions.

The units involved in the embodiments of the present disclosure can be implemented by software or hardware. Where the name of the unit does not define the unit itself in some cases.

For example, the first obtaining unit can also be described as "the unit for obtaining at least two Internet protocol addresses".

The above functions described herein may be performed at least in part by one or more hardware logic components. For example, without limitation, exemplary types of hardware logic components that can be used include a field programmable gate array (Field Programmable Gate Array, FPGA), an application specific integrated circuit (Application Specific Integrated Circuit, ASIC), an application specific standard part (Application Specific Standard Part, ASSP), a system on chip (System on Chip, SOC), a complex programmable logic device (Complex Programmable Logic Device, CPLD), etc.

In the context of the present disclosure, a machine-readable medium may be a tangible medium that may include or store a program used by or in connection with an instruction execution system, an apparatus or a device. The machine-readable medium may be a machine-readable signal medium or a machine-readable storage medium. The machine-readable medium may include, but not limited to, electronic, magnetic, optical, electromagnetic, infrared, or semiconductor systems, apparatuses, or devices, or any suitable combination of the above. More specific examples of the machine-readable storage medium include one or more wire-based electrical connections, a portable computer disk, a hard disk, a random access memory (RAM), a read-only memory (ROM), an erasable programmable read-only memory (EPROM), a flash memory, an optical fiber, a portable compact disk read-only memory (CD-ROM), an optical storage device, a magnetic storage device, or any suitable combination of the above.

An embodiment of the present disclosure further provides a computer program, when executed by a processor, executes the information display method provided by any one of the above embodiments. In a first aspect, an embodiment of the present disclosure provides an information display method, including:

controlling, in response to a first triggering operation for displaying a first user interface, a first navigation key to transform to a first function key;

where the first navigation key is used to provide a function of switching the other interface to the first user interface, and the first function key is used to provide a first function matching with the first user interface.

According to one or more embodiments of the present disclosure, the controlling the first navigation key to transform to the first function key includes:

determining, according to the first triggering operation, the first function matching with the first user interface; and displaying the first function key corresponding to the first function in the first user interface.

According to one or more embodiments of the present disclosure, the method further includes:

executing, in response to a second triggering operation acting on the first function key, an operation corresponding to the first function.

According to one or more embodiments of the present disclosure, the first user interface is used to play an audio/video, and the first function is a playing/pausing-control function; and the method further includes:

displaying a first icon on the first function key, where the first icon matches with a current playing state of the audio/video in the first user interface.

According to one or more embodiments, the executing, in response to a second triggering operation acting on the first function key, an operation corresponding to the first function includes:

controlling, in response to the second triggering operation, a current state of the audio/video to change, and switching the first icon to a second icon, where the second icon matches with a changed state of the audio/video.

According to one or more embodiments of the present disclosure, the method further includes:

switching, in response to a third triggering operation acting on the first user interface or the other navigation key other than the first navigation key, the first user interface to the other interface matching with the other navigation key, and controlling the first function key to transform to the first navigation key.

According to one or more embodiments of the present disclosure, the method further includes:

acquiring playing information of the audio/video, and displaying the playing information on the first navigation key.

According to one or more embodiments of the present disclosure, the method further includes:

maintaining, after the switching to the other interface matching with the other navigation key, a playing state of the audio/video before switching to the other interface matching with the other navigation key.

According to one or more embodiments of the present disclosure, the playing information includes at least one of the following: a progress bar of the audio/video, a state of the progress bar, and a picture matching with the audio/video;

where the state of the progress bar is consistent with the current state of the audio/video.

According to one or more embodiments of the present disclosure, the method further includes:

controlling, in response to a press operation acting on a random key, an icon corresponding to the random key to deform, where the random key includes at least the first function key, the first navigation key, and the other navigation key.

In a second aspect, an embodiment of the present disclosure provides an information display apparatus, where the apparatus includes:

a function-transforming module, configured to control, in response to a first triggering operation for displaying a first user interface, a first navigation key to transform to a first function key;

where the first navigation key is used to provide a function of switching the other interface to the first user interface, and the first function key is used to provide a first function matching with the first user interface.

According to one or more embodiments of the present disclosure, the function-transforming module is specifically configured to: determine a first function matching with a first user interface according to the first triggering operation; and display a first function key corresponding to the first function in the first user interface.

According to one or more embodiments of the present disclosure, the information display apparatus may further include: a function-executing module; where the function-executing module is configured to execute, in response to a second triggering operation acting on the first function key, an operation corresponding to the first function.

According to one or more embodiments of the present disclosure, the first user interface is used to play an audio/video, where the first function is a playing/pausing-control function; the information display apparatus may further include: an icon-processing module; and the icon-processing module is configured to display a first icon on the first function key, where the first icon matches with a current playing state of the audio/video in the first user interface.

According to one or more embodiments of the present disclosure, the function-executing module is specifically configured to: control, in response to the second triggering operation, a current state of the audio/video to change, and switch the first icon to the second icon, where the second icon matches with a changed state of the audio/video.

According to one or more embodiments of the present disclosure, the function-transforming module is further configured to: switch, in response to a third triggering operation acting on the first user interface or the other navigation key other than the first navigation key, the first user interface to the other interface matching with the other navigation key, and control the first function key to transform to the first navigation key.

According to one or more embodiments of the present disclosure, the information display apparatus may further include: a playing information-acquiring module; where the playing information-acquiring module is configured to acquire playing information of the audio/video, and display the playing information on the first navigation key.

According to one or more embodiments of the present disclosure, the information display apparatus may further include: a processing module; where the processing module is configured to maintain, after switching to the other interface matching with the other navigation key, a playing state of the audio/video before switching to the other interface matching with the other navigation key.

According to one or more embodiments of the present disclosure, the playing information includes at least one of the following: a progress bar of the audio/video, a state of the progress bar, and a picture matching with the audio/video; where the state of the progress bar is consistent with the current state of the audio/video.

In one or more embodiments of the present disclosure, the information display apparatus may further includes: a pressing module; where the pressing module is configured to control, in response to a press operation acting on a random key, an icon corresponding to the random key to deform, where the random key includes at least the first function key, the first navigation key, and the other navigation key.

In a third aspect, an embodiment of the present disclosure provides an electronic device, including:

at least one processor and a memory;
the memory stores a computer-executable instruction; and
the at least one processor executes the computer-executable instruction stored in the memory to cause the at least one processor to execute the information display method in any one of the first aspect.

In a fourth aspect, an embodiment of the present disclosure provides a computer-readable storage medium storing a computer-executable instruction therein, and when executing the computer-executable instruction, the processor executes the information display method in any one of the first aspect.

In a fifth aspect, an embodiment of the present disclosure provides a computer program product including a computer program carried on a computer-readable medium, and the computer program, when executed by a processor, executes the information display method in any one of the first aspect.

In a sixth aspect, an embodiment of the present disclosure provides a computer program, where the computer program, when executed by a processor, executes the information display method in any one of the first aspect. The above description is only a description of preferred embodiments of the present disclosure and applied technical principles. It should be understood by those skilled in the art that the disclosure scope involved in the present disclosure is not limited to the technical solution formed by the specific combination of the above technical features, but also covers other technical solutions formed by any combination of the above technical features or equivalent features thereof without departing from the above disclosure concept. For example, the technical solution formed by replacing the above features with the technical features with similar functions disclosed in (but not limited to) the present disclosure.

In addition, although the operations are depicted in a particular order, this should not be understood as requiring that the operations are performed in the particular order shown or in a sequential order. Under certain circumstances, multitasking and parallel processing may be advantageous. Similarly, although several specific implementation details are included in the above discussion, these should not be interpreted as limitations on the scope of the present disclosure. Certain features described in the context of separate embodiment may also be implemented in a single embodiment in combination. On the contrary, various features described in the context of a single embodiment can also be implemented in multiple embodiments individually or in any suitable sub-combination.

Although the subject matter has been described in language specific to structural features and/or logical acts of methods, it should be understood that the subject matter defined in the appended claims is not necessarily limited to the specific features or acts described above.

On the contrary, the specific features and actions described above are merely exemplary forms for implementing the claims.

What is claimed is:

1. An information display method, comprising:
   controlling, in response to a first triggering operation for displaying a first user interface, a first navigation key to transform to a first function key;
   wherein the first navigation key is used to provide a function of switching an other interface to the first user interface, and the first function key is used to provide a first function matching with the first user interface,
   wherein the first user interface is used to play an audio/video, and the first function is a playing/pausing-control function, and
   wherein the method further comprises:
   acquiring playing information of the audio/video, and displaying the playing information on the first navigation key, when controlling the first function key to transform to the first navigation key,
   wherein the playing information comprises a progress bar of the audio/video, a state of the progress bar, and a picture matching with the audio/video, and
   wherein the state of the progress bar is consistent with a current state of the audio/video.

2. The method according to claim 1, wherein the controlling the first navigation key to transform to the first function key comprises:
   determining, according to the first triggering operation, the first function matching with the first user interface; and
   displaying the first function key corresponding to the first function in the first user interface.

3. The method according to claim 1, wherein the method further comprises:
   executing, in response to a second triggering operation acting on the first function key, an operation corresponding to the first function.

4. The method according to claim 1, wherein the method further comprises:
   displaying a first icon on the first function key, wherein the first icon matches with a current playing state of the audio/video in the first user interface.

5. The method according to claim 4, wherein executing, in response to a second triggering operation acting on the first function key, an operation corresponding to the first function comprises:
   controlling, in response to the second triggering operation, the current state of the audio/video to change, and switching the first icon to a second icon, wherein the second icon matches with a changed state of the audio/video.

6. The method according to claim 1, wherein the method further comprises:
   switching, in response to a third triggering operation acting on the first user interface or an other navigation key other than the first navigation key, the first user interface to the other interface corresponding to the other navigation key, and controlling the first function key to transform to the first navigation key.

7. The method according to claim 6, wherein the method further comprises:
   maintaining, after switching to the other interface corresponding to the other navigation key, a playing state of the audio/video before switching to the other interface corresponding to the other navigation key.

8. The method according to claim 6, wherein the method further comprises:
   controlling, in response to a press operation acting on a random key, an icon corresponding to the random key to deform, wherein the random key comprises at least the first function key, the first navigation key, and the other navigation key.

9. The method according to claim 1, wherein the transforming from the first navigation key to the first function key is performed in an application program to which the first user interface and the other interface belong.

10. The method according to claim 1, wherein the method further comprises:
    controlling the first function key to transform to the first navigation key if no operation acting on the first user interface is monitored within a preset time interval.

11. The method according to claim 1, wherein the acquiring playing information of the audio/video comprises:
    if the audio/video in a playing page is in a playing state, after the playing page is switched to an interface corresponding to an other navigation key, switching the first function key to the first navigation key, and displaying a dynamic trembling sound wave bar on the first navigation key; and
    if the audio/video in a playing page is in a playing-pause state, after the playing page is switched to an interface corresponding to an other navigation key, switching the first function key to the first navigation key, and displaying a static sound wave bar on the first navigation key.

12. The method according to claim 1, wherein the playing information is a cover picture of the audio/video in combination with the progress bar, and the acquiring playing information of the audio/video comprises:
    acquiring a cover picture relating to the audio/video according to the audio/video;
    generating a progress bar in consistence with a current playing progress of the audio/video according to the current playing progress of the audio/video; and
    merging the progress bar with the cover picture according to a playing/pausing state of the audio/video in the first user interface, and generating the playing information of the audio/video.

13. An information display apparatus, comprising: at least one processor and a memory;
    the memory stores a computer-executable instruction; and
    the at least one processor executes the computer-executable instruction stored in the memory to cause the at least one processor to:

control, in response to a first triggering operation for displaying a first user interface, a first navigation key to transform to a first function key;

wherein the first navigation key is used to provide a function of switching an other interface to the first user interface, and the first function key is used to provide a first function matching with the first user interface, wherein the first user interface is used to play an audio/video, and the first function is a playing/pausing-control function, and wherein the processor is further configured to:

acquire playing information of the audio/video, and display the playing information on the first navigation key, when controlling the first function key to transform to the first navigation key, wherein the playing information comprises a progress bar of the audio/video, a state of the progress bar, and a picture matching with the audio/video, and wherein the state of the progress bar is consistent with a current state of the audio/video.

14. The apparatus according to claim 13, wherein the processor is further configured to:

determine, according to the first triggering operation, the first function matching with the first user interface; and display the first function key corresponding to the first function in the first user interface.

15. The apparatus according to claim 13, wherein the processor is further configured to:

execute, in response to a second triggering operation acting on the first function key, an operation corresponding to the first function.

16. The apparatus according to claim 13, wherein the processor is further configured to:

display a first icon on the first function key, wherein the first icon matches with a current playing state of the audio/video in the first user interface.

17. The apparatus according to claim 16, wherein the processor is further configured to:

control, in response to the second triggering operation, the current state of the audio/video to change, and switch the first icon to a second icon, wherein the second icon matches with a changed state of the audio/video.

18. The apparatus according to claim 13, wherein the processor is further configured to:

switch, in response to a third triggering operation acting on the first user interface or an other navigation key other than the first navigation key, the first user interface to the other interface corresponding to the other navigation key, and control the first function key to transform to the first navigation key.

19. The apparatus according to claim 18, wherein the processor is further configured to:

maintain, after switching to the other interface corresponding to the other navigation key, a playing state of the audio/video before switching to the other interface corresponding to the other navigation key.

20. A non-transitory computer-readable storage medium, wherein the computer-readable storage medium stores a computer-executable instruction, and when executing the computer-executable instruction, a processor implements the information display method according to claim 1.

* * * * *